United States Patent
Lu et al.

(10) Patent No.: US 10,582,424 B2
(45) Date of Patent: Mar. 3, 2020

(54) HANDOVER METHOD AND MOBILITY MANAGEMENT NETWORK ELEMENT

(71) Applicant: HUAWEI TECHNOLOGIES CO., LTD., Shenzhen (CN)

(72) Inventors: Feng Lu, Shenzhen (CN); Yijun Yu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/945,026

(22) Filed: Jul. 18, 2013

(65) Prior Publication Data

US 2013/0301614 A1 Nov. 14, 2013

Related U.S. Application Data (63) Continuation of application No. PCT/CN2011/070391, filed on Jan. 19, 2011.

(51) Int. Cl.
*H04W 36/00* (2009.01)

(52) U.S. Cl.
CPC .............................. *H04W 36/0016* (2013.01)

(58) Field of Classification Search
CPC ................................................ H04W 36/0016
See application file for complete search history.

(56) References Cited

U.S. PATENT DOCUMENTS

| | | | |
|---|---|---|---|
| 8,964,691 B2* | 2/2015 | Chen | 370/331 |
| 2009/0270099 A1* | 10/2009 | Gallagher | H04W 8/08 455/435.1 |
| 2010/0311386 A1 | 12/2010 | Edge et al. | |
| 2011/0207462 A1* | 8/2011 | Hallenstal | H04W 60/04 455/436 |
| 2011/0249652 A1* | 10/2011 | Keller et al. | 370/331 |
| 2011/0280217 A1* | 11/2011 | Drevon et al. | 370/331 |
| 2012/0224564 A1* | 9/2012 | Paisal et al. | 370/331 |
| 2013/0142168 A1* | 6/2013 | Vedrine et al. | 370/331 |
| 2013/0235846 A1 | 9/2013 | Nishida et al. | |

FOREIGN PATENT DOCUMENTS

| | | |
|---|---|---|
| CN | 101662756 | 3/2010 |
| CN | 101848515 | 9/2010 |
| JP | 2011-61248 | 3/2011 |
| WO | 2010/044730 A2 | 4/2010 |
| WO | WO2010/044737 | 4/2010 |

(Continued)

OTHER PUBLICATIONS

*Change Request*, S2-105367, 3GPP TSG SA WG2 Meeting #82, Nov. 15-19, 2010, Jacksonville, Utah, pp. 1-12.

(Continued)

*Primary Examiner* — Jason E Mattis
(74) *Attorney, Agent, or Firm* — Leydig, Voit & Mayer, Ltd.

(57) ABSTRACT

A target mobility management network element receives a forward relocation request message sent by a source mobility management network element, where the forward relocation request message includes single radio voice call continuity SRVCC capability information; and the target mobility management network element sends, to an target access network element, a first request message that carries information of SRVCC operation possible.

9 Claims, 4 Drawing Sheets

(56) References Cited

FOREIGN PATENT DOCUMENTS

| WO | 2010/052589 A2 | 5/2010 |
|---|---|---|
| WO | 2010/092457 A1 | 8/2010 |

OTHER PUBLICATIONS

3rd *Generation Partnership Project; Technical Specification Group Services and System Aspects; Single Radio Voice Call Continuity (SRVCC); Stage 2 (Release 9)*, 3GPP TS 23.216 V9.6.0 (Dec. 2010), pp. 1-42.
3rd *Generation Partnership Project; Technical Specification Group Services and System Aspects; General Packet Radio Service (GPRS) enhancements for Evolved Universal Terrestrial Radio Access Network (E-UTRAN) access (Release 10)*, 3GPP TS 23.401 V10.2.0 (Dec. 2010), pp. 1-276.
3rd *Generation Partnership Project; Technical Specification Group Radio Access Network; Evolved Universal Terrestrial Radio Access Network (E-UTRAN); X2 application protocol (X2AP) (Release 9)*, 3GPP TS 36.423 V9.5.0 (Dec. 2012), pp. 1-121.
*Change Request,* S2-111471, 3GPP TSG SA WG2 Meeting #84, Apr. 11-15, 2011, Bratislava, Slovakia (5 pp.).

International Search Report, dated Oct. 27, 2011, in corresponding International Application No. PCT/CN2011/070391 (4 pp).
Written Opinion of the International Searching Authority, dated Oct. 27, 2011, in corresponding International Application No. PCT/CN2011/070391 (4 pp.).
Search Report, dated Mar. 25, 2013, in corresponding Chinese Application No. 201180000804.6 (5 pp.).
First Office Action, dated May 28, 2013, in corresponding Chinese Application No. 201180000804.6 (15 pp.).
Extended European Search Report dated Feb. 5, 2014, in corresponding European Patent Application No. 11855931.9.
Japanese Office Action dated Jul. 8, 2014 in corresponding Japanese Patent Application No. 2013-549689.
Huawei: "HSPA SRVCC RAN2 impacts", 3GPP TSG-RAN WG2 Meeting #64; R2-086691; Prague Czech Republic; Nov. 10, 2008, Nov. 10, 2008 (Nov. 10, 2008).
Motorola: "Voice component info sent to the MSC Server during SRVCC", 3GPP TSG-SA WG2 Meeting #69; S2-087984; Miami USA; Oct. 17, 2008, Nov. 17, 2008 (Nov. 17, 2008).
NTT Docomo, NEC: "vSRVCC procedure to support voice+video handover (one step approach)", 3GPP TSG SA WG2 Meeting #80; S2-103575; Brunstad, Norway; Aug. 30, 2010, Aug. 30, 2010 (Aug. 30, 2010).

* cited by examiner

HANDOVER METHOD AND MOBILITY MANAGEMENT NETWORK ELEMENT

CROSS-REFERENCE TO RELATED APPLICATIONS

This application is a continuation of International Application No. PCT/CN2011/070391 filed on Jan. 19, 2011, which is incorporated herein by reference in its entirety.

TECHNICAL FIELD

The present invention relates to the field of communications technologies, and in particular, to a handover method and a mobility management network element.

BACKGROUND

An evolved universal mobile telecommunication system territorial radio access network (Evolved Universal Mobile Telecommunication System Territorial Radio Access Network; E-UTRAN) and an evolved packet core network (Evolved Packet Core Network, EPC) form an evolved packet system (Evolved Packet System, EPS). The evolved packet system generally adopts an Internet Protocol (Internet Protocol; IP) multimedia subsystem (IP Multimedia Subsystem; IMS) to provide a voice service.

Given that an initial E-UTRAN deployment cannot achieve a whole-network coverage, therefore, IMS voice cannot be provided outside an E-UTRAN coverage scope. To maintain continuity of a voice call along an E-UTRAN coverage boundary, a 3rd generation partnership (The 3rd Generation Partnership Project; 3GPP) defines a single radio voice call continuity (Single Radio Voice Call Continuity; SRVCC) technology to achieve a handover from an E-UTRAN to a circuit domain (Circuit Switching; CS) of an enhanced radio access network (GSM EDGE Radio Access Network; GERAN) or a territorial radio access network (UMTS Territorial Radio Access Network; UTRAN), or a handover from 3GPP2 1xCS packet switched (Packet Switched; PS) to the CS. Further, the SRVCC technology also achieves a handover from UTRAN high speed packet access (High Speed Packet Access, HSPA) to the GERAN/UTRAN. A radio access network network element may trigger performing an SRVCC handover only if it is learned that a user equipment (User Equipment/Mobile Station; UE/MS, hereinafter collectively referred to as a UE) and the mobility management network element (as regards different radio communication networks, it may be a mobility management entity (Mobility Management Entity; MME) or a service general packet radio technology (General Packet Radio Service; GPRS) supporting node (Serving GPRS Support Node; SGSN), and so on) support the SRVCC, and under a scenario in which a user is allowed to use the SRVCC.

When the prior art applies to an attach or a location update process, if the mobility management network element learns, by receiving an attach request/location update request message sent by the user equipment, that the UE has the SRVCC capability, learns, from subscription data sent by a home subscriber server, that the user is allowed to use the SRVCC, and learns that the mobility management network element supports the SRVCC, the mobility management network element sends an initial context setup request message to the radio access network network element, indicating that the radio access network network element may perform an SRVCC operation.

However, when the prior art applies to a packet switched handover (Packet Switched Handover; PS HO) process, the target mobility management network element may not correctly learn whether the user is allowed to use the SRVCC, and accordingly the target radio access network network element may not correctly learn whether the SRVCC operation may be performed. In addition, the target radio access network network element incorrectly triggers an SRVCC handover. This results in an SRVCC handover failure and a waste of a large number of relevant exchanged signaling; or, this may result in a failure of performing the SRVCC handover and interruption of a user voice service.

SUMMARY

Embodiments of the present invention provide a handover method and a mobility management network element for solving a problem in prior art that an SRVCC handover is incorrectly triggered because a target radio access network network element may not learn whether the SRVCC operation may be performed, which results in an SRVCC handover failure and a waste of a large number of relevant exchanged signaling. In addition, this may result in the SRVCC handover failure and interruption of a user voice service.

An embodiment of the present invention provides a handover method, including:

receiving, by a target mobility management network element, a forward relocation request message sent by a source mobility management network element, wherein the forward relocation request message includes single radio voice call continuity SRVCC capability information; and sending, by the target mobility management network element to a target access network network element, a first request message that carries information of SRVCC operation possible.

An embodiment of the present invention provides a mobility management network element, including:

a receiving module, configured to receive a forward relocation request message sent by a source mobility management network element, where the forward relocation request message includes single radio voice call continuity SRVCC capability information; and a sending module, configured to send, to a target access network element, a first request message that carries information of SRVCC operation possible.

The embodiments of the present invention provide a handover method and a mobility management network element. The source mobility management network element indicates whether the target mobility management network element is SRVCC capable through a forward relocation request, which enables the target mobility management network element to correctly indicate that a target radio access network network element is SRVCC capable, and enables the target radio access network network element to correctly trigger an SRVCC handover, and saves network's signaling exchanges, and ensures correct usage of a user's voice service.

BRIEF DESCRIPTION OF DRAWINGS

To illustrate the technical solutions in the embodiments of the present invention or in the prior art more clearly, the accompanying drawings needed for describing the embodiments or the prior art are briefly described in the following. Apparently, the accompanying drawings in the following description merely show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention more clearly, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
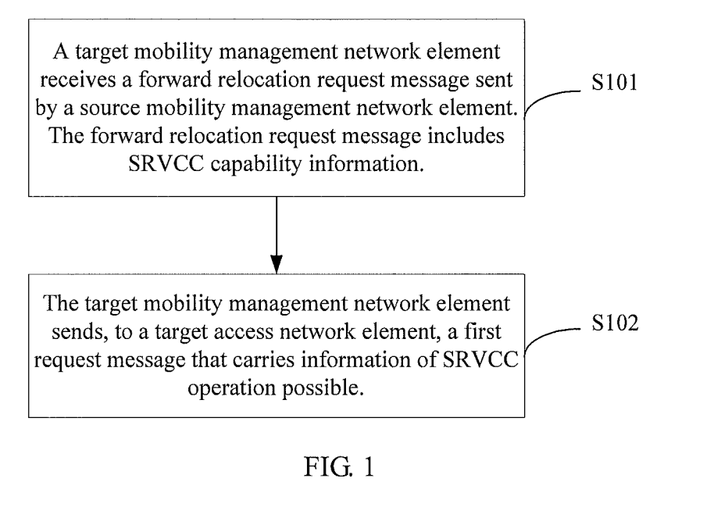
FIG. 1 is a flowchart of a handover method according to Embodiment 1 of the present invention.

FIG. 1 is a flowchart of a handover method according to Embodiment 1 of the present invention. As shown in FIG. 1, the method includes:

S101: A target mobility management network element receives a forward relocation request message sent by a source mobility management network element. The forward relocation request message includes single radio voice call continuity SRVCC capability information.

S102: The target mobility management network element, to a target access network element, a first request message that carries information of SRVCC operation possible.

According to different networks where a user equipment is located, the source mobility management network element and the target mobility management network element may be a mobility management equipment such as an MME or an SGSN; a source radio access network network element and a target radio access network network element may be a device such as an evolved base station (Evolved Node B; eNodeB) or a radio network controller (Radio Network Controller: RNC).

In a handover process, the source mobility management network element receives a handover request message or a relocation request message sent by the source radio access network network element. To enable the target radio access network network element to correctly perform a handover operation, the source mobility management network element needs to notify the target management network element whether a user is allowed to use the SRVCC, or a UE's SRVCC capability and whether the user is allowed to use the SRVCC, so that the target mobility management network element may notify the target radio access network network element of a UE's SRVCC capability, whether the user is allowed to use the SRVCC, and whether the target mobility management network element supports the SRVCC, which enables the target radio access network network element to correctly perform an SRVCC handover operation.

A forwarded relocation request message sent by the source mobility management network element to the target mobility management network element includes SRVCC capability information. The SRVCC capability information may be used to indicate that a user is SRVCC capable.

The SRVCC capability information specifically includes: at least one of a single radio voice call continuity session transfer number (Session Transfer Number for SR-VCC, STN-SR) and a relevant mobile station international ISDN number (Correlation Mobile Subscriber International ISDN Number, C-MSISDN); or, SRVCC permission information, for example, an SRVCC permission indication (SRVCC is Allowed); or, information of SRVCC operation possible, for example, SRVCC operation possibility indication (SRVCC Operation Possible).

That the user is SRVCC capable may include: the user is allowed to use the SRVCC. Or, that the user is SRVCC capable may also include both that the user is allowed to use the SRVCC and that a user equipment has SRVCC capability.

In addition, the SRVCC capability information may also be used to indicate: the source mobility management network element is SRVCC capable. That the source mobility management network element is SRVCC capable may specifically be that the source mobility management network element supports the SRVCC or supports the Sv interface, and so on.

After the target mobility management network element receives the forward relocation request sent by the source mobility management network element, the target mobility management network element sends a first request message to the target radio access network network element. The first request message may be a handover request message or relocation request message, and the first request message carries the information of SRVCC operation possible. This specifically includes the following:

If the target mobility management network element supports the SRVCC (that is, the target mobility management network element is SRVCC capable), the target mobility management network element may send a first request message that includes the SRVCC operation possibility indication (SRVCC Operation Possible) to the target radio access network network element. The SRVCC operation possibility indication may indicate that the user is SRVCC capable and the target MME is SRVCC capable (If the indication is not included, it indicates that an SRVCC operation is incapable); or the target mobility management network element may send the first request message that includes the SRVCC operation possibility indication (SRVCC Operation Possible) to the target radio access network network element. If the value of the SRVCC operation possibility indication is true (TRUE) or 1, it indicates that an SRVCC operation is capable (If the SRVCC operation possibility indication is false (FALSE) or 0, it indicates that an SRVCC operation is incapable, that is, at least one of the user and the target MME is SRVCC incapable.

The handover method provided by the embodiment, in which the source mobility management network element indicates, through a forward relocation request, whether the target mobility management network element is SRVCC capable, which enables the target radio access network network element to correctly trigger an SRVCC handover, saves network's signaling exchanges, and ensures normal usage of a user voice service.

Figure 2:
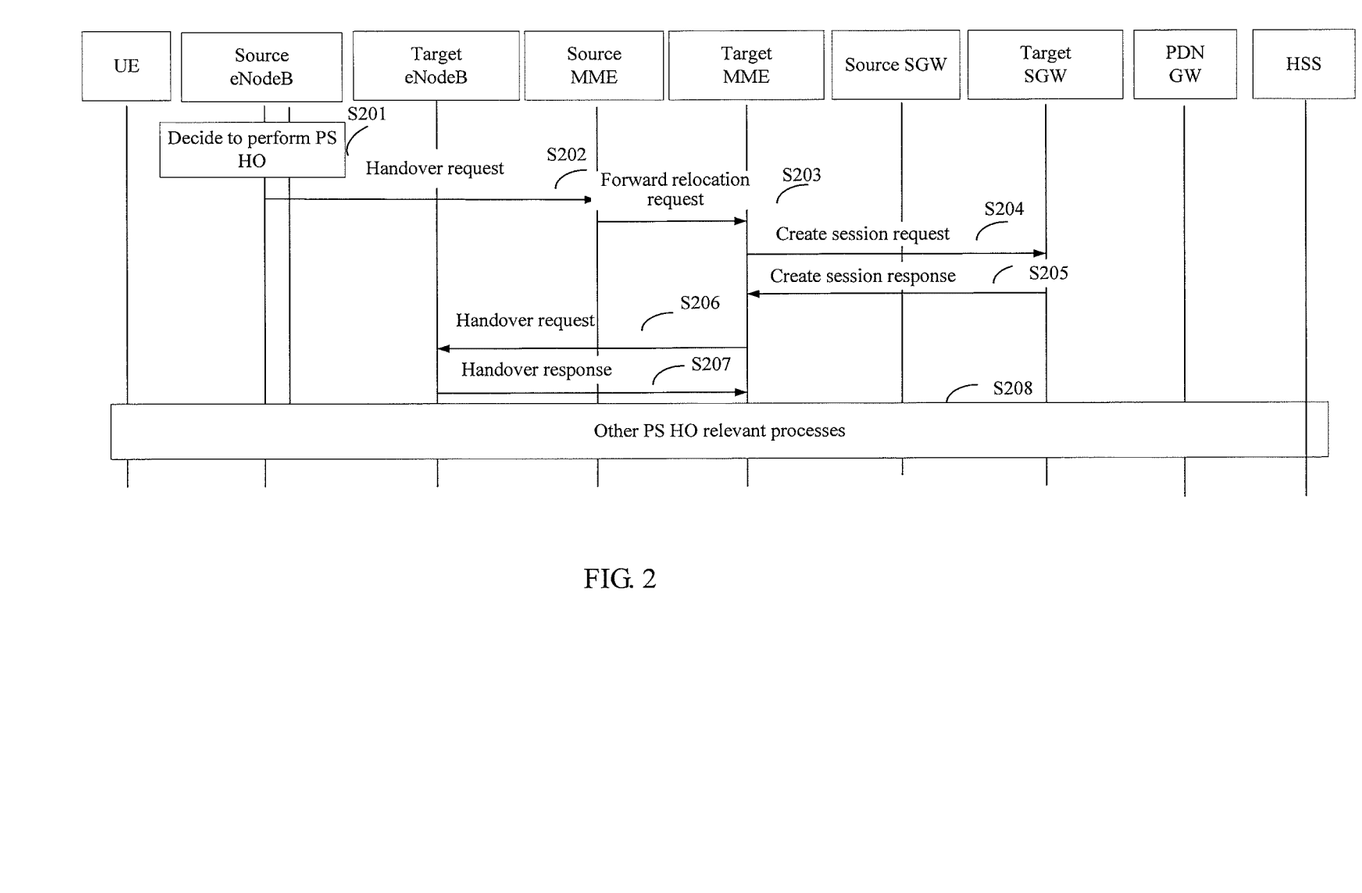
FIG. 2 is a flowchart of a handover method according to Embodiment 2 of the present invention.

FIG. 2 is a flowchart of a handover method according to Embodiment 2 of the present invention. The embodiment uses processing of a handover performed by a UE attached to the E-UTRAN as an example. Both source and target mobility management network elements are MMEs and both source and target radio access network network element are eNodeBs. It should be noted that the embodiment only provides a specific application scenario of the handover method, however, does not use this as the limitation for the embodiment in the present invention. As shown in FIG. 2, this method includes:

S201: A source eNodeB decides to initiate an S1-based handover (The source eNodeB decides to initiate an S1-based handover to the target eNodeB).

S202: The source eNodeB sends a handover request (Handover Required) message (that is, a second request message) to a source MME.

S203: The source MME sends a forward relocation request (Forward Relocation Request) message to a target MME.

The forward relocation request message includes the SRVCC capability information, which indicates that a user is single radio voice call continuity capable (that is, the user is SRVCC capable). That the specific content of that the user is SRVCC capable may include but is not limited to any of the following methods:

A user is allowed to use the SRVCC; or, the user is allowed to use the SRVCC and a user equipment has the SRVCC capability. In addition, the SRVCC capability information may also indicate: the source mobility management network element is SRVCC capable. That the source mobility management network element is SRVCC capable may be that the source mobility management network element supports the SRVCC or supports the Sv interface, and so on. The user equipment has the SRVCC capability specifically may be that the user equipment supports the SRVCC.

Based on the above, the SRVCC capability information specifically may be used to indicate any of the following content:

(1) the user is SRVCC capable;
(2) the user is SRVCC capable and the source mobility management network element is SRVCC capable;
(3) the user is allowed to use the SRVCC;
(4) the user is allowed to use the SRVCC and the user equipment has the SRVCC capability;
(5) the user is allowed to use the SRVCC and the source mobility management network element is SRVCC capable; and
(6) the user is allowed to use the SRVCC, the user equipment has the SRVCC capability, and the source mobility management network element is SRVCC capable.

Specific implementation of the SRVCC capability information may include but is not limited to any of the following methods:

(1) The SRVCC capability information includes: at least one of a single radio voice call continuity session transfer number (STN-SR) and a relevant mobile station international ISDN number (C-MSISDN); or, SRVCC permission information, for example, an SRVCC permission indication (SRVCC is Allowed); or, information of SRVCC operation possible, for example, SRVCC operation possibility indication (SRVCC Operation Possible). The embodiment does not limit a specific name of the information or indication.

The STN-SR and/or C-MSISDN, or SRVCC permission information, or the information of SRVCC operation possible may be used to indicate any of the above mentioned 6 indication content, for example, indicating that the user is SRVCC capable, or indicating that the user is SRVCC capable and the source mobility management network element is SRVCC capable, or, indicating that the user is allowed to use the SRVCC, or indicating that the user is allowed to use the SRVCC and the user equipment has the SRVCC capability, and so on.

(2) The SRVCC capability information may also include: SRVCC capability information, for example, SRVCC capability indication (SRVCC capability indication). The SRVCC capability information may be used to indicate that the user equipment has the SRVCC capability. The embodiment does not limit a specific name of the information or indication.

A scenario that the SRVCC capability information includes the SRVCC capability information includes but is not limited to: the STN-SR and/or C-MSISDN or the SRVCC permission information or the information of SRVCC operation possible indicates that the user is allowed to use the SRVCC, and the SRVCC capability information may indicate that the user equipment has the SRVCC capability. The STN-SR and/or C-MSISDN or SRVCC permission information or information of SRVCC operation possible and the SRVCC capability information together indicate that the user is allowed to use the SRVCC and the user equipment has the SRVCC capability or the user is SRVCC capable.

Before a source MME sends the relocation request message to the target MME, the source MME may learn the SRVCC capability information through but not limited to any of the following methods:

When a UE is attached to a network for the first time, the UE needs to send an attach request (Attach Request) message to the source MME; or, if the UE has been attached to a network, and the UE location changes, the UE sends a location update request to the source MME (the source MME in a location update process is a target mobility management network element), for example: a tracking area update request (Tracking Area Update Request, TAU) message. If the UE has the SRVCC capability, the UE may carry an SRVCC capability indication (SRVCC capability indication) in the attach request message/tracking area update request message, for example, the SRVCC capability indication may be included in an "MS Network Capability" information element in the attach request message/tracking area update request message.

In addition, after the source MME receives the attach request message or location update request message sent by the UE, a location update request is sent to a home subscriber server; after the home subscriber server receives the location update request, UE's user subscription information is returned to the mobility management network element; if a user is allowed to use the SRVCC (SRVCC subscribed allowed), the UE's user subscription data may include the STN-SR and C-MSISDN, that is, the source MME may learn that the user is allowed to use the SRVCC from the home subscriber server. The home subscriber server is a home subscriber server (Home Subscriber Server; HSS).

The source MME may learn that the user is SRVCC capable according to the user is allowed to use the SRVCC or the user equipment has the SRVCC capability and the user is allowed to use the SRVCC. The source MME may learn that itself (the source MME) is SRVCC capable according to configuration information.

S204: The target MME sends a create session request (Create Session Request) message to a target service gateway.

S205: The target MME receives a create session response (Create Session Response) message sent by the target service gateway.

S206: The target MME sends a handover request (Handover Required) message (that is, a first request message) to the target eNodeB.

The handover request message may include single radio voice call continuity operation possibility information (SRVCC operation possible).

If the target MME learns that the user is SRVCC capable (that is, the UE is allowed to use the SRVCC or the UE is allowed to use the SRVCC and the UE has the SRVCC capability), it should be taken that the target MME is SRVCC capable (that is, the SRVCC is supported), for example, the MME supports completion of an SRVCC handover through the Sv interface, the target MME may include the information of SRVCC operation possible in a handover request message sent to the target eNodeB, indicating that the user is SRVCC capable and the target MME is SRVCC capable, and the target eNodeB may record the information of SRVCC operation possible, which is used to determine whether an SRVCC handover may be triggered.

Specifically, the target MME may include the SRVCC operation possibility indication (SRVCC operation possible indication) in a handover request sent to the target eNodeB. The SRVCC operation possibility indication may indicate that the user is SRVCC capable and the target MME is SRVCC capable, if the indication is not included, it indicates that an SRVCC operation is incapable (that is, at least one of the user and the target MME is SRVCC incapable); or, the target MME may include the information of SRVCC operation possible (SRVCC operation possible indication) in a handover request message sent to the target eNodeB; if the value of the SRVCC operation possibility indication is true (TRUE) or 1, it indicates that the SRVCC operation is capable and the target MME is SRVCC capable; if the value of the SRVCC operation possibility indication is false (FALSE) or 0, it indicates that the SRVCC operation is incapable (that is, at least one of the user and the target MME is SRVCC incapable).

S207: The target MME receives a handover response (Handover Response) message from the target eNodeB.

S208: Perform relevant PS HO steps which may include but are not limited to: creating a temporary data transfer tunnel, updating uplink and downlink user planes, performing a tracking area update and deleting the temporary data transfer channel, and so on.

In addition, in performing a tracking area update request process in step S208, when the target MME sends a user equipment context modification request (UE CONTEXT MODIFICATION REQUEST) message to the target eNodeB, the information of SRVCC operation possible may be included in the user equipment context modification request message; in this case, it is not limited to whether the handover request message in the previous step S206 includes the information of SRVCC operation possible.

For specific content and achievement of the information of SRVCC operation possible included in the user equipment context modification request message, reference may be made to the description of step S206, which are not described here.

Figure 3:
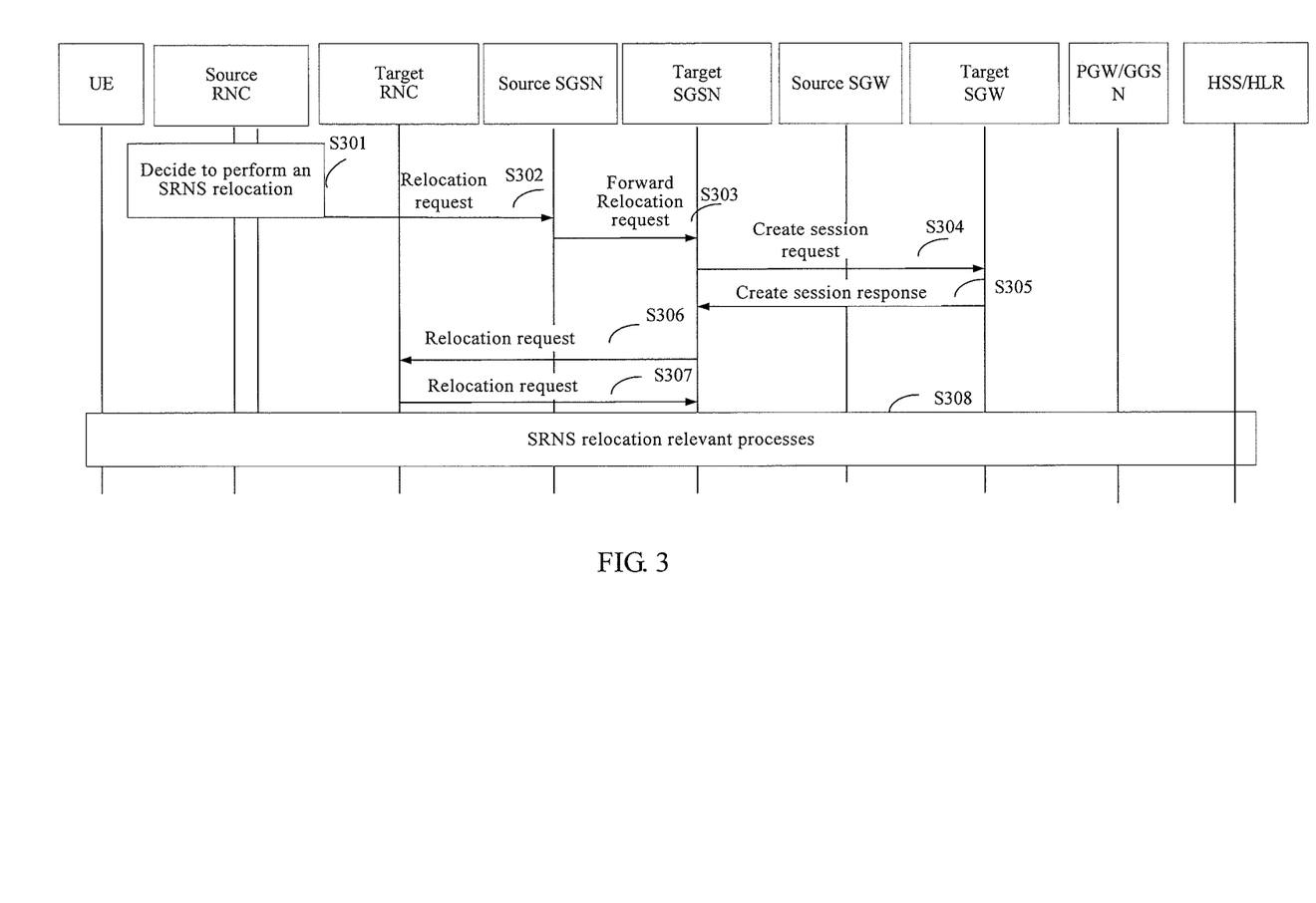
FIG. 3 is a flowchart of a handover method according to Embodiment 3 of the present invention.

FIG. 3 is a flowchart of a handover method according to Embodiment 3 of the present invention. This embodiment uses processing of a serving radio network subsystem (Serving Radio Network Subsystem; SRNS) relocation (Relocation) of a UE attached to a UTRAN (high speed packet access technology (High Speed Packet Access; HSPA)) as an example. Both source and target mobility management network elements are SGSNs and both source and target radio access network network elements are RNCs. It should be noted that the embodiment only provides a specific application scenario of the handover method, however, does not use this as the limitation for the embodiment in the present invention. As shown in FIG. 3, this method includes:

S301: A source RNC decides to initiate a serving radio network subsystem relocation (SRNS relocation).

S302: The source RNC sends a relocation request (Relocation Required) message (that is, a second request message) to a source SGSN.

S303: The source SGSN sends a forward relocation request (Forward Relocation Request) message to a target SGSN.

The forward relocation request message includes the SRVCC capability information, which indicates that a user is single radio voice call continuity capable (the user is SRVCC capable). The specific content of that the user is SRVCC capable may include but is not limited to any of the following methods: the user is allowed to use the SRVCC; or, the user is allowed to use the SRVCC and a user equipment has the SRVCC capability. In addition, the SRVCC capability information may also indicate: the source mobility management network element is SRVCC capable. That the source mobility management network element of is SRVCC capable may be that the source mobility management network element supports the SRVCC or supports the Sv interface, and so on. The user equipment has the SRVCC capability specifically may be the user equipment supports the SRVCC.

Based on the above, the SRVCC capability information specifically may be used to indicate any of the following content:

(1) the user is SRVCC capable;
(2) the user is SRVCC capable and the source mobility management network element is SRVCC capable;
(3) the user is allowed to use the SRVCC;
(4) the user is allowed to use the SRVCC and the user equipment has the SRVCC capability;
(5) the user is allowed to use the SRVCC and the source mobility management network element is SRVCC capable; and
(6) the user is allowed to use the SRVCC, the user equipment has the SRVCC capability, and the source mobility management network element is SRVCC capable.

Specific implementation of the SRVCC capability information may include but is not limited to any of the following methods:

(1) The SRVCC capability information includes: at least one of a single radio voice call continuity session transfer number (STN-SR) and a relevant mobile station international ISDN number (C-MSISDN); or, SRVCC permission information, for example, an SRVCC permission indication (SRVCC is Allowed); or, information of SRVCC operation possible, for example, SRVCC operation possibility indication (SRVCC Operation Possible). The embodiment does not limit a specific name of the information or indication.

The STN-SR and/or C-MSISDN, or SRVCC permission information, or information of SRVCC operation possible may be used to indicate any of the indication content, for example, indicating that the user is SRVCC capable, or indicating that the user is SRVCC capable and the source mobility management network element is SRVCC capable, or, indicating that the user is allowed to use the SRVCC, or indicating that the user is allowed to use the SRVCC and the user equipment has the SRVCC capability, and so on.

(2) The SRVCC capability information may also include: SRVCC capability information, for example, SRVCC capability indication (SRVCC capability indication). The SRVCC capability information may be used to indicate that the user equipment has the SRVCC capability. The embodiment does not limit a specific name of the information or indication.

A scenario that the SRVCC capability information includes the SRVCC capability information includes but is not limited to: the STN-SR and/or C-MSISDN or the SRVCC permission information or information of SRVCC operation possible indicates that the user is allowed to use the SRVCC, and the SRVCC capability information may indicate that the user equipment has the SRVCC capability. The STN-SR and/or C-MSISDN or SRVCC permission information or information of SRVCC operation possible and the SRVCC capability information indicate that the user is allowed to use the SRVCC and the user equipment has the SRVCC capability or the user is SRVCC capable.

Before a source SGSN sends the relocation request message to an target SGSN, the source MME may learn the SRVCC capability information through but not limited to any of the following methods:

When the UE is attached to a network for the first time, the UE needs to send an attach request (Attach Request) message to the source SGSN; or, if the UE has been attached to a network, and the UE location changes, the UE sends a location update request to the source SGSN, for example: a routing area update request (Routing Area Update, RAU). If the UE has the SRVCC capability, the UE may carry an SRVCC capability indication (SRVCC capability indication) in the attach request message or routing area update request message, for example, the SRVCC capability indication may be included in an "MS Network Capability" information element in the attach request message/routing area update request message.

In addition, after the source SGSN receives the attach request message or location update request message sent by the UE, a location update request is sent to the home subscriber server; after the home subscriber server receives the location update request, UE's user subscription information is returned to the mobility management network element. If a user is allowed to use the SRVCC (SRVCC subscribed allowed), the UE's user subscription data may include the STN-SR and C-MSISDN, that is, the source SGSN may learn that the user is allowed to use the SRVCC from the home subscriber server. The home subscriber server may be a home location register (Home Location Register; HLR) or an HSS, and so on.

The source SGSN may learn that the user is SRVCC capable according to that the user is allowed to use the SRVCC or that the user equipment has the SRVCC capability and that the user is allowed to use the SRVCC. The source SGSN may learn that itself (source SGSN) is SRVCC capable according to configuration information.

S304: The Target SGSN sends a create session request (Create Session Request) message to a target service gateway.

If the target SGSN uses an S4 interface, perform step S404 and step S405; otherwise, if the target SGSN uses a Gn/Gp interface, do not perform step S404 and step S405.

S305: The target SGSN receives a create session response (Create Session Response) message sent by the target service gateway.

S306: The target SGSN sends a relocation request (Relocation Request) message (that is, a first request message) to the target RNC.

The handover request message may include single radio voice call continuity operation possibility information (SRVCC operation possible).

If the target SGSN learns that the user is SRVCC capable (that is, the user is allowed to use the SRVCC, or the UE is allowed to use the SRVCC and the UE has the SRVCC capability), then if the target SGSN is SRVCC capable (that is, the SRVCC is supported), for example, the SGSN supports completion of an SRVCC handover through the Sv interface, the target SGSN may include the information of SRVCC operation possible in a relocation request message sent to the target RNC, indicating that the user is SRVCC capable and the target SGSN is SRVCC capable, the target RNC may record the information of SRVCC operation possible, which is used to trigger an SRVCC handover.

Specifically, the target SGSN may include the SRVCC operation possibility indication (SRVCC operation possible indication) in a handover request sent to the target eNodeB. The SRVCC operation possibility indication may indicate that the user is SRVCC capable and the target SGSN is SRVCC capable. If the indication is not included, it indicates that an SRVCC operation is incapable (that is, at least one of the user and the target SGSN is SRVCC incapable); or, the target SGSN may include the information of SRVCC operation possible (SRVCC operation possible indication) in a handover request message sent to the target eNodeB; if the value of the SRVCC operation possibility indication is true (TRUE) or 1, it indicates that the SRVCC operation is capable and the target SGSN is SRVCC capable; if the value of the SRVCC operation possibility indication is false (FALSE) or 0, it indicates that the SRVCC operation is incapable (that is, at least one of the user and the target SGSN is incapable).

S307: The target SGSN receives a relocation response (Relocation Response) message from the target RNC.

S308: Perform other SRNS Relocation steps, which specifically include but are not limited to: updating uplink and downlink user planes, performing a routing area update and so on.

In addition, in performing a routing area update request process in step S308, when the target SGSN sends a common ID (Common ID) message to the target RNC, the information of SRVCC operation possible may also be included in the common ID; in this case, it is not limited to whether the handover request message in the previous step S306 includes the information of SRVCC operation possible.

For specific content and achievement of the information of SRVCC operation possible included in the common ID message, reference may be made to the description of step S306, which are not described here.

A person of ordinary skill in the art may understand that all or part of the processes of the methods in the embodiments may be implemented by a computer program instructing relevant hardware. The program may be stored in a computer readable storage medium. When the program is run, the processes of the methods in the embodiments are performed. The storage medium may be a magnetic disk, an optical disk, a read-only memory (Read-Only Memory, ROM), or a random access memory (Random Access Memory, RAM).

Figure 4:
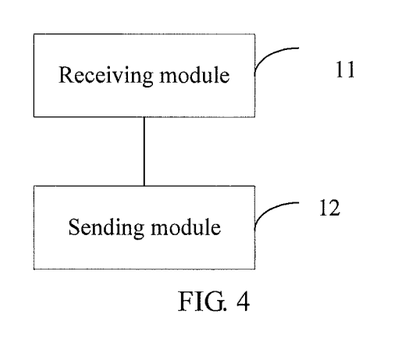
FIG. 4 is a schematic structural diagram of a mobility management network element according to Embodiment 1 of the present invention.

FIG. 4 is a schematic structural diagram of a mobility management network element according to Embodiment 1 of the present invention. As shown in FIG. 4, the mobility management network element includes: a receiving module 11 and a sending module 12, where the receiving module 11 is configured to receive a forward relocation request message sent by a source mobility management network element, the forward relocation request message includes single radio voice call continuity SRVCC capability information; and the sending module 12 is configured to send, to a target access network element, a first request message that carries information of SRVCC operation possible.

Based on the previous embodiment, the SRVCC capability information included in the forward relocation request message received by the receiving module 11 may be used to indicate that the user is SRVCC capable.

Further, the SRVCC capability information included in the forward relocation request message received by the receiving module 11 may also be used to indicate that the source mobility management network element is SRVCC capable.

That the user is SRVCC capable includes: a user is allowed to use the SRVCC, or the user is allowed to use the SRVCC and a user equipment has the SRVCC capability.

As an exemplary embodiment, the SRVCC capability information included in the forward relocation request message received by the receiving module 11 may include:

a single radio voice call continuity session transfer number STN-SR and/or a relevant mobile station international ISDN number C-MSISDN;

or, information of SRVCC operation possible.

Further, the information of SRVCC operation possible carried in the first request message sent by the sending module 12 to the access network element of the destination side may be used to indicate that the user is SRVCC capable and the target mobility management network element is SRVCC capable.

The mobility management network element provided by the embodiment of the present invention is the target mobility management network element involved in the handover method provided by the present invention; for a specific operation process, reference may be made to the prior method embodiments, which is not described here again.

The mobility management network element provided by the embodiment, in which the source mobility management network element indicates, through a forward relocation request, whether the target mobility management network element is SRVCC capable, which enables the target radio access network network element to correctly trigger an SRVCC handover, saves network's signaling exchanges, and ensures normal usage of a user voice service.

Finally, it should be noted that the embodiments are merely intended for describing the technical solutions of the present invention other than limiting the present invention. Although the present invention is described in detail with reference to the embodiments, a person of ordinary skill in the art should understand that they may still make modifications to the technical solutions described in the embodiments or make equivalent replacements to some technical features thereof, without departing from the spirit and scope of the technical solutions of the embodiments of the present invention.

What is claimed is:

1. A handover method, comprising:
    receiving, by a target mobility management network element (MME) of an evolved universal mobile telecommunication system territorial radio access network (E-UTRAN), before a single radio voice call continuity (SRVCC) handover is performed, a forward relocation request message sent by a source MME of the E-UTRAN during a packed switched handover (PS HO) in the E-UTRAN, wherein the forward relocation request message comprises SRVCC capability information, wherein the SRVCC capability information comprises a session transfer number for SRVCC (STN-SR) and a correlation mobile subscriber international ISDN number (C-MSISDN) of a user equipment and the SRVCC capability information indicates a user is allowed to use the SRVCC and indicates the user equipment has SRVCC capability; and
    sending, by the target MME of the E-UTRAN, based on the SRVCC capability information, to a target evolved Node B (eNodeB) of the E-UTRAN, a handover request message that carries information of SRVCC operation possibility;
    wherein the information of SRVCC operation possibility indicates that the user is allowed to use the SRVCC, indicates the user equipment has the SRVCC capability, and indicates the target MME of the E-UTRAN is SRVCC capable and supports an Sv interface which is used for the SRVCC handover, and wherein the information of SRVCC operation possibility is used by the target eNodeB of the E-UTRAN to determine whether the user equipment can be switched to a circuit switching (CS) domain via the SRVCC handover.

2. The method according to claim 1, wherein the SRVCC capability information indicates that the source MME is SRVCC capable.

3. The method according to claim 1, wherein before the receiving, by the target MME, the forward relocation request message sent by the source MME, the method further comprises:
    receiving, by the source MME, a second request message sent by a source access network element.

4. A mobility management network element (MME) of an evolved universal mobile telecommunication system territorial radio access network (E-UTRAN), comprising:
    a receiving interface, configured to, before a single radio voice call continuity (SRVCC) handover is performed, receive a forward relocation request message sent by a source MME of the E-UTRAN during a packed switched handover (PS HO) in the E-UTRAN, wherein the forward relocation request message comprises SRVCC capability information, wherein the SRVCC capability information comprises a session transfer number for SRVCC (STN-SR) and a correlation mobile subscriber international ISDN number (C-MSISDN) of a user equipment and the SRVCC capability information indicates a user is allowed to use the SRVCC and indicates the user equipment has SRVCC capability;
    a processor operatively coupled to the receiving interface and configured to receive the forward relocation request message and generate a handover request message that carries information of SRVCC operation possibility; and
    a sending interface operatively coupled to the processor and configured to send, based on the SRVCC capability information, to a target evolved Node B (eNodeB) of the E-UTRAN, the handover request message that carries information of SRVCC operation possibility;
    wherein the information of SRVCC operation possibility indicates that the user is allowed to use the SRVCC, indicates the user equipment has the SRVCC capability, and indicates the target MME of the E-UTRAN is SRVCC capable and supports an Sv interface which is used for the SRVCC handover, and wherein the information of SRVCC operation possibility is used by the target eNodeB of the E-UTRAN to determine whether the user equipment can be switched to a circuit switching (CS) domain via the SRVCC handover.

5. The MME according to claim 4, wherein the SRVCC capability information indicates that the source MME is SRVCC capable.

6. A non-transitory computer-readable medium, comprising computer-readable program code, which, when executed by a computer unit, will cause the computer unit to perform the functions comprising:
> receiving, by a target mobility management network element (MME) of an evolved universal mobile telecommunication system territorial radio access network (E-UTRAN), before a single radio voice call continuity (SRVCC) handover is performed, a forward relocation request message sent by a source MME of the E-UTRAN during a packed switched handover (PS HO) in the E-UTRAN, wherein the forward relocation request message comprises SRVCC capability information, wherein the SRVCC capability information comprises a session transfer number for SRVCC (STN-SR) and a correlation mobile subscriber international ISDN number (C-MSISDN) of a user equipment and the SRVCC capability information indicates a user is allowed to use the SRVCC and indicates the user equipment has SRVCC capability; and
> sending, by the target MME of the E-UTRAN, based on the SRVCC capability information, to a target evolved Node B (eNodeB) of the E-UTRAN, a handover request message that carries information of SRVCC operation possibility;
> wherein the information of SRVCC operation possibility indicates that the user is allowed to use the SRVCC, indicates the user equipment has the SRVCC capability, and indicates the target MME of the E-UTRAN is SRVCC capable and supports an Sv interface which is used for the SRVCC handover, and wherein the information of SRVCC operation possibility is used by the target eNodeB of the E-UTRAN to determine whether the user equipment can be switched to a circuit switching (CS) domain via the SRVCC handover.

7. The non-transitory computer-readable medium of claim 6, wherein the SRVCC capability information indicates that the computer unit is SRVCC capable.

8. The non-transitory computer-readable medium of claim 6, before the receiving, by the target MME, the forward relocation request message sent by the source MME, the computer unit further performs the functions comprising:
> receiving, by the source MME, a second request message sent by a source access network element.

9. The non-transitory computer-readable medium of claim 6, wherein the SRVCC capability information indicates that the source MME is SRVCC capable.

\* \* \* \* \*